United States Patent
Martin (10) Patent No.: US 9,258,315 B2
(45) Date of Patent: Feb. 9, 2016

(54) DYNAMIC FILTERING FOR SDN API CALLS ACROSS A SECURITY BOUNDARY

(71) Applicant: Cisco Technology, Inc., San Jose, CA (US)

(72) Inventor: Antonio Martin, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 49 days.

(21) Appl. No.: 14/153,742

(22) Filed: Jan. 13, 2014

(65) Prior Publication Data

US 2015/0200955 A1 Jul. 16, 2015

(51) Int. Cl.
*H04L 29/06* (2006.01)
*G06F 21/56* (2013.01)
*H04L 12/24* (2006.01)

(52) U.S. Cl.
CPC ............ *H04L 63/14* (2013.01); *G06F 21/562* (2013.01); *H04L 63/0227* (2013.01); *H04L 63/0245* (2013.01); *H04L 63/0263* (2013.01); *H04L 63/08* (2013.01); *H04L 63/1408* (2013.01); *H04L 63/1441* (2013.01); *H04L 63/168* (2013.01); *H04L 41/0813* (2013.01)

(58) Field of Classification Search
CPC . H04L 63/1416; H04L 63/1408; H04L 63/08; H04L 63/14; H04L 63/168; H04L 63/0227; H04L 63/0245; H04L 63/0263; H04L 63/1441; H04L 41/0813; G06F 21/552; G06F 21/562
USPC ........................................................ 726/23
See application file for complete search history.

(56) References Cited

U.S. PATENT DOCUMENTS

| 7,302,634 | B2* | 11/2007 | Lucovsky et al. ............. 715/200 |
| 7,490,073 | B1* | 2/2009 | Qureshi et al. ................. 706/50 |
| 7,607,172 | B2 | 10/2009 | Zurko et al. | |

(Continued)

FOREIGN PATENT DOCUMENTS

| EP | 1542426 A2 | 6/2005 |
| EP | 2469445 A1 | 6/2012 |

OTHER PUBLICATIONS

Stack Overflow, "JQuery Validate on Elements Not Yet Created," http://stackoverflow.com/questions/672155/jquery-validate-on-elements-not-yet-created, Retrieved Sep. 25, 2013, 3 Pages.

(Continued)

*Primary Examiner* — Kambiz Zand
*Assistant Examiner* — Benjamin Kaplan
(74) *Attorney, Agent, or Firm* — Edell, Shapiro & Finnan, LLC (57) ABSTRACT

Presented herein are techniques to reduce the vulnerabilities of network elements to malicious API calls. One or more filters that validate data across an API boundary at a network element are dynamically loaded into the network element such that a reboot of the network element is not required to use the one or more filters. An API call is received for an API function, wherein the API call contains one or more parameter values associated with the API function. The parameters may be validated using the one or more filters. If it is determined that the one or more filters validate the parameters for the API function, the API function may be executed using the parameter values. If it is determined that the one or more filters do not validate the parameters for the API function, the execution of the API function may be aborted.

20 Claims, 4 Drawing Sheets

(56) References Cited

U.S. PATENT DOCUMENTS

| | | | |
|---|---|---|---|
| 8,339,959 | B1 | 12/2012 | Moisand et al. |
| 2005/0154900 | A1 | 7/2005 | Muttik |
| 2006/0150162 | A1* | 7/2006 | Mongkolsmai et al. ...... 717/131 |
| 2007/0121596 | A1* | 5/2007 | Kurapati et al. ............. 370/356 |
| 2009/0052443 | A1 | 2/2009 | Kolenchery et al. |
| 2010/0005505 | A1 | 1/2010 | Gottimukkala et al. |
| 2012/0137137 | A1* | 5/2012 | Brickell et al. ............... 713/182 |
| 2013/0218872 | A1 | 8/2013 | Jehuda |
| 2014/0289864 | A1* | 9/2014 | Dimitrakos et al. ............ 726/26 |

OTHER PUBLICATIONS

Stack Overflow, "JQuery Validate Dynamically Add Rules," http://stackoverflow.com/questions/1819651/jquery-validate-dynamically-add-rules, Retrieved Sep. 25, 2013, 2 Pages.

International Search Report and Written Opinion for corresponding application No. PCT/US2015/010212, dated Apr. 14, 2015, 9 pages.

* cited by examiner

DYNAMIC FILTERING FOR SDN API CALLS ACROSS A SECURITY BOUNDARY

TECHNICAL FIELD

The present disclosure relates to validating application programming interface (API) calls.

BACKGROUND

To alter the configuration settings of network elements such as switches, routers, firewalls, virtual switches and routers, etc., traditionally an administrator would log into the device, either through a web browser or directly. Software Defined Networking (SDN) provides an application programming interface (API) to internal functions of network elements, and allows both internal and external applications to dynamically change network element behavior and configuration "on-the-fly".

The API exposes internal network element functionality that was never originally intended or designed to be exposed. A single API call may access several internal calls, which may themselves call others. As a result, malicious input may be received by potentially hundreds of internal device calls that were not designed to robustly handle malicious input.

DESCRIPTION OF EXAMPLE EMBODIMENTS

Overview

Presented herein are techniques to reduce the vulnerabilities of network elements to malicious API calls. One or more filters that validate data across an API boundary at a network element are dynamically loaded into the network element such that a reboot of the network element is not required to use the one or more filters. An API call is received for an API function, wherein the API call contains one or more parameter values associated with the API function. The parameters may be validated using the one or more filters. If it is determined that the one or more filters validate the parameters for the API function, the API function may be executed using the parameter values. If it is determined that the one or more filters do not validate the parameters for the API function, the execution of the API function may be aborted.

Example Embodiments

Figure 1:
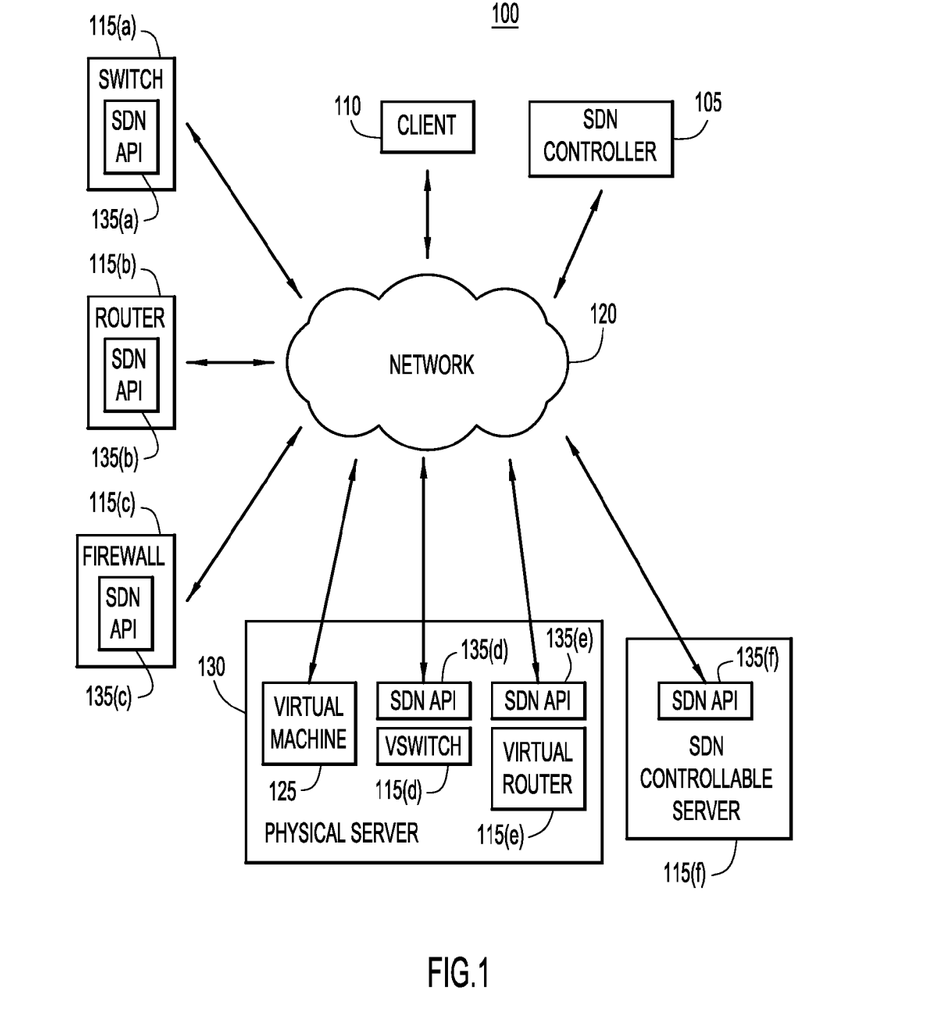
FIG. 1 shows an example system including one or more network elements in communication with a controller, and which network elements may be configured with the dynamic API call filtering and validation capabilities described herein.

Reference is first made to FIG. 1. FIG. 1 shows a system 100 in which an SDN controller 105 or a client 110 may communicate with network elements 115(a)-115(f) via a network 120. Software-defined networking (SDN) is a networking approach in which control is decoupled from hardware and given to a software application called a controller. The SDN controller 105 may operate from a physical computing device or from a virtual or cloud-based computing resource. SDN controllers manage network elements using protocols and standards, such as with Cisco System's One Platform Kit (OnePK), to allow controllers to instruct and configure network elements how to process and route packets. An administrator using the SDN controller can change any network element's rules using application programming interface (API) calls, and may prioritize, de-prioritize and block specific types of packets across the network.

FIG. 1 shows that network element 115(a) is a physical network switch, while network element 115(b) is a physical network router, both of which may both receive and forward traffic in network 120 via SDN API layers 135(a)-135(f). Network element 115(c) is a physical network firewall/security appliance that monitors and control which traffic may be forwarded into the network 120. The firewall may also be implemented in software on another network element, for example on physical server 115(f). Any number of switches, routers and firewalls may be present in the network 120, all of which may contain respective SDN API layers 135(a)-135(f) that allow interaction with the SDN controller 105.

In addition to the physical elements discussed above, a given network deployment may include one or more virtual switches 115(d) and virtual routers 115(e). Each virtual switch 115(d) and virtual router 115(e) may be configured to manage communications of one or more virtual machines 125 in particular virtual networks and/or subnetworks (subnets). Each virtual switch 115(d) may be embodied by software and stored and executed on the physical server 130. Thus, the virtual switch 115(d) performs functions of a physical switch device. Similarly, each virtual machine 125 may be software stored and executed on the physical server 130 and perform functions similar to, for example, physical machine 115(f). The virtual machines 125 are configured to exchange communications with other virtual machines via the network 120. It is appreciated that any number of physical servers hosting any number of virtual switches, virtual routers and virtual machines may be present in the system 100.

A client 110 may take the form of a physical or virtual computing device, and may initiate API calls on any of the network elements 115(a)-115(f) across the network 120. This may occur for example, via a controller such as the SDN controller 105. While elements 115(a)-115(f) are example physical and virtual network elements, other network elements may be configured to perform the techniques presented herein.

Traditionally, network elements were designed as closed systems requiring a network administrator to log into the device either locally or on the local network to alter settings or configurations of the network element. A trusted administrator would normally configure networking elements, either via a command line interface or browser interface. These configurations would remain static and devices would be unable to adapt to changing network needs. SDN provides a powerful API that may be called from any location with local or wide area network connectivity or even from applications running within a networking element. A SDN API call may in turn call multiple internal operating system functions to perform the given request on a given network device. Those calls may in turn affect other calls in the operating environment. The result is that, using API calls, external users, which previously had no direct access to networking element internal calls, can either directly or indirectly calls hundreds of API functions never originally designed to be exposed. A single API call, for example from the extensive API set of OnePK, may expose thousands of code paths and functions. However, client 110 and other users may be malicious, and network element configuration functionality is not necessarily built for robustness. While the robustness of network elements is typically improved over time, the call stacks of network elements is often extensive, and as a result complete testing of all paths is not possible. Further, it can take months for a fix to be deployed, thus a solution is needed that allows for the protection of the device from malicious calls that can be deployed quickly.

Figure 2:
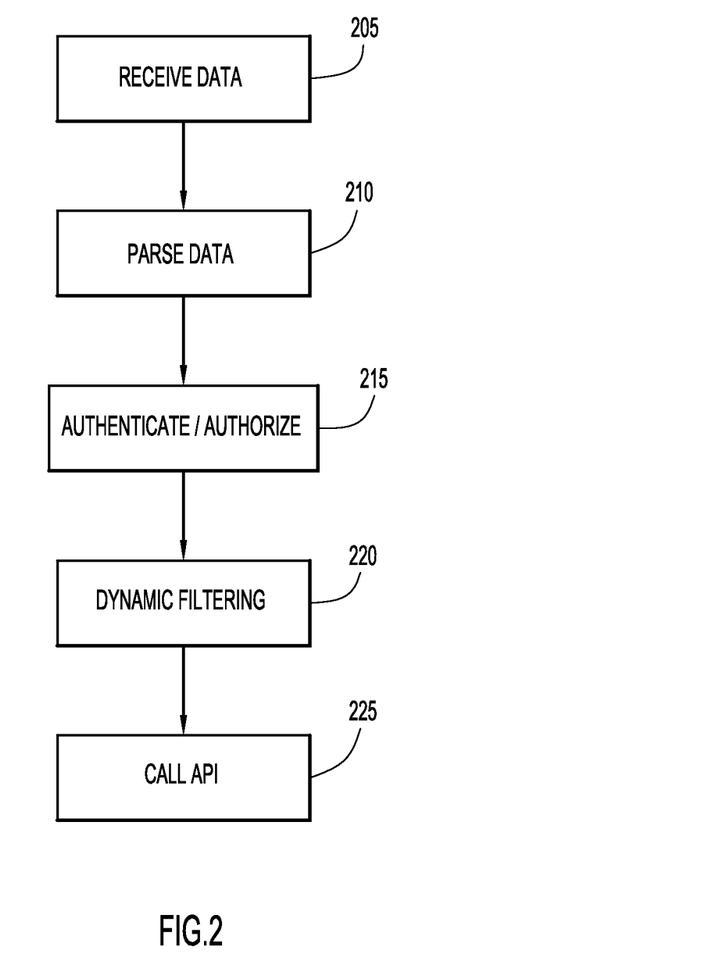
FIG. 2 shows a general example flow chart depicting operations when calling an API of a network element using dynamic filtering techniques.

To illustrate these problems and present a solution, FIG. 2 shows an example flow chart depicting operations of the dynamic filtering techniques when calling an API of a network element. At step 205, data from an API call is received. This may be a local call or from a remote server, for example from controller 105 or client 110. The call may use sockets, inter-process communication (IPC), and may be encrypted with Transport Layer Security (TLS), etc. At step 210, the information in the data is parsed. This may include the API call reference, the parameters for the API call and authentication information such as a session identifier (ID) or username and password. If all of the information is parsed properly, the process continues. At step 215, information parsed out is used to authenticate the caller and validate that the caller of the API has the proper authorization to make the requested call. If the caller does have authorization, the process continues. Step 215 may be optional if the caller is already in an authenticated path. At step 220, dynamic filters are applied to the API call according to techniques presented herein. The details of the operations 220 are described below in connection with FIG. 3. At step 225, if the filters do not discover an error, the requested API call may be invoked with the provided parameters and calls the underlying operating system, router, switch or network element calls, as necessary.

As discussed previously, information contained in the API call cannot be trusted. To prevent erroneous or malicious calls from being executed, the API call may be validated without the dynamic filters of step 220, but this validation may not be perfect. For example, in authentication step 215 the network element may fail to verify the information properly and thus allow an attacker to exploit the system. The authorization information may be malicious. For example, the API call may have JavaScript in the username field, or there may be a buffer overflow in the digital certificate information, etc. Another problem is the API call at step 225 is working on data that it must verify. If the system does not validate the API call information correctly, the system may be exploited. The exploit may be in the API call itself, or in one of the functions it calls in the router or switch.

Another problem is simply complexity. Steps 205-225 may be ported to multiple network elements. As mentioned above, a single API may touch hundreds of underlying platform-specific function calls. Coupled with the fact that network elements are typically not designed throughout to be externally robust (i.e. hardened), it becomes nearly impossible to ensure that there are no exploits in the network element firmware. API sets such as that contained in Cisco Systems' OnePK are so extensive that hackers and other malicious users are likely to find ways to utilize incorrect data in a parameter to cause, for example, an overflow exploit, an elevation of privileges, or simply cause the network element to crash. Elevating privileges occurs when a user is able to increase their access level through malicious input. For example, a low-level user may normally be only able to access status information APIs, but may be able to gain access to higher-level APIs which govern operating settings of the network element. Even a high privileged user may be able to use an exploit to gain higher root status.

Although hackers and other malicious users are likely to find security problems using API calls, security fixes to network elements can take months, if not over a year before they are deployed. Additionally, network element users may delay the adoption of network element firmware updates while they perform their own testing. During this time, the network element manufacturer's reputation may be greatly harmed. Further, network element users may decide not to adopt firmware updates such as security fixes at all, since the cost of testing and verifying on the user/client end may be very high. Thus, the dynamic filtering of step 220 is needed to protect networking devices and elements.

Figure 3:
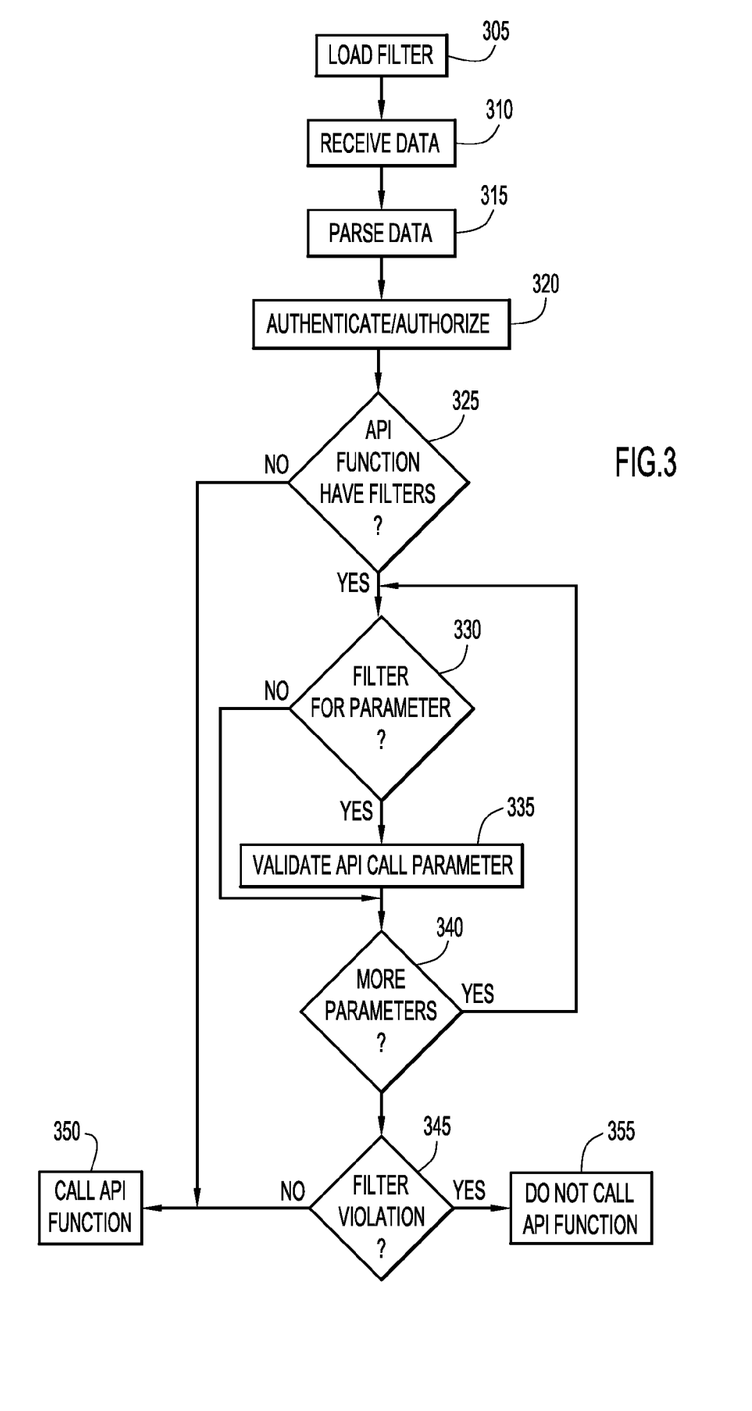
FIG. 3 shows a more detailed example flow chart for the dynamic filtering techniques to validate parameters of an API call.

The dynamic filtering functionality is shown in greater detail by the operational flow of the flowchart in FIG. 3. At step 305, one or more filters may be loaded into the network element. A filter may be software containing instructions to validate received API calls, or it may be a data file indicating one or more API calls, parameters and filter types and values. When the network element is booted, re-booted, reloaded, or when instructed to load, one or more filters may be loaded which address one or more known vulnerabilities on the network element. Each filter may be for a specific API call and for a specific API call parameter. A filter may be loaded via an SDN API 135(*a*)-135(*f*) on the network element in communication with the SDN controller 105. Alternatively, filter loading via the SDN API may be disabled by a user or administrator. Since security vulnerabilities may exist on a given network element, those vulnerabilities may be exploited to load malicious or undesired filters, or delete existing filters. Instead, a user or administrator of a given network element capable of utilizing dynamic filters may be required to use a non-SDN and non-API method such as a command line interface (CLI) to load filters.

At step 310, raw buffer data containing an API call is received, which may be from a local or remote source. The buffer data may use sockets, IPC, and may be encrypted with TLS, etc. At step 315, filters may first be loaded and applied at the parse data layer, in order to check for malformed data such as malformed strings that can exploit data parsing vulnerabilities. If the filters do not detect a problem, the buffer data is parsed. The parsed buffer data may include the API call itself, the parameters for the API call and the authentication information such as a sessions identifier (ID), username and password. After parsing out the API call, the API call value may be used to identify the API call. Using the API call identity, associated filters may also be loaded and applied to check for malformed data in the API call. The filters in step 315 are optional, and filters on the identified particular API call may be performed preferentially over filters on the raw buffer data to reduce computational cost. If the information is parsed properly and no malformed data is detected, either with the buffer data or the API call itself, the flow proceeds to authorization step 320.

At step 320, information parsed out is used to authenticate the caller and validate that the caller has proper authorization to make the requested call. This functional block may be optional if the caller is already in an authenticated path. Filters may be associated with this step in order to look for malicious information in the authentication layer. If authentication and authorization passes, and any associated filters also pass without errors, the flow proceeds to step 325.

At step 325, before calling the API function the system checks to see if there is a loaded dynamic filter associated with the API call parameters. The filters are dynamic because they are not necessarily hardcoded in the operating system image. Rather, they may be dynamically loaded from a filter file or filter data store. If there are no associated filters for the API function in the filter set file, the API function may be called immediately at step 350. In this manner, the processing and time overhead if there are no associated filters is minimal. If there is an associated filter with the API call, the system may apply filters on a per-parameter basis. When one or more filters exist associated with a given parameter, they may be in-line and non-bypassable. Thus, a user may not circumvent the application of the filter in the API call process. At step 330, if there is an associated filter for a given parameter, the filter is executed to validate the API call parameter at step 335. At step 340, if there are additional parameters that have not yet been checked, the flow returns to step 330 and repeats to execute any remaining filters associated with any remaining parameters for the API call. In this manner, one or more filters may be applied for each of one or more parameters of an API call.

At step 345, if there was a filter violation at any point in the iterative parameter filter check process, the flow proceeds to step 355 and the API function may not be called. If there are no filter violations, the API function of the network element may be called at step 350. As mentioned above, these filters may be loaded dynamically and automatically from a file or data store, and they may be temporary. When a new firmware image for the network element is released with the security fix, the associated filter may be automatically removed.

Filter application may be optional. When a vulnerability is found, either in the "wild," by a client or other user, or internally to the network element vendor company, a filter may be prepared and made available to each network element client user. The network element may contact the vendor to retrieve a list or retrieve all available filters and associated information. The client user may then decide whether or not they wish to automatically apply the filter. Filters may be written in Extensible Markup Language (XML), although other formats are envisioned and within the scope and spirit of the techniques presented herein. Filters may be prepared in a matter of hours or days, thus avoiding the long time frames associated with firmware updates to the network element image.

Filters may also be imported as independent, pluggable modules that do parameter checking. These modules may be dynamically loadable software instead of loadable validation rules. In such an embodiment, the system would have hooks that the API layer could load. This would allow a filter to be loaded dynamically on the fly.

Filters may enforce a variety of input requirements. For example, there may be a minimum integer value or minimum string length, or a maximum integer value or string length for a given parameter. There may be one or more specific integer or string values to check for, which are immediately designated as valid, invalid, or are associated with additional logic. Filters may also contain one or more regular expression white lists that strings need to comply with to be acceptable. Filters may also have one or more regular expression black lists, where if an input string matches, validation automatically fails. Additional types of filters would be consistent with techniques presented herein.

An example of the steps discussed in FIG. 3 will now be described in further detail. The user making API calls may be an SDN controller 105, or any user such as client 110. An API layer may exist on physical and virtual elements 115(*a*)-115(*f*). The API layer may use an Interface Description Language (IDL) like Corva, although other languages are possible according to techniques presented herein. The IDL advertises what the functions look like. An example of an API function is as follows:

```
case 152: { // example of what generated code may look like
NetworkElement_getSomeInfoIDL(
    NetworkElement_getSomeInfoIDL _args_(arg_)->session,
    NetworkElement_getSomeInfoIDL _args_(arg_)->severity,
    NetworkElement_getSomeInfoIDL _args_(arg_)->message,
    break;
}
```

The API function example shown above has three parameters, each of which may be associated with one or more filters. As shown, function getSomeInfoIDL( ) has parameters session, severity and message. As discussed in regards to step 325, if there is no filter associated with API function getSomeInfoIDL( ), a simple Boolean check is all that may be required, so as to minimize overhead. For example:

```
case 152: {
// simple Boolean check if filters exist for any parameters.
// If it exists, check, if there is no filter, continue to API call
if (dynamic_filter_for_NetworkElement_getSomeInfoIDL) {
    // Filter code in this block.
}
NetworkElement_getSomeInfoIDL( //calls API function
    ...//API function from above
}
```

If no filters exist, as discussed previously, the flow may then proceed to call the API function at step 350. If filters do exist, filters may then be executed iteratively on a per-parameter basis. Note again that simple Booleans may be used to only validate parameters which have an associated filter, which helps minimize overhead. For example:

```
case 152: { // This case is for the specific function called
// Is there any filters for this API?
if (dynamic_filter_for_NetworkElement_getSomeInfoIDL) {
    // Is there a filter for the session parameter
    if (Validation_Function_List[struct_index_(arg_)].-
    vars_list[0].filter) {
        validation +=
        validate_int(NetworkElement_getSomeInfoIDL->session,
        Validation_Function_List[struct_index_(arg_)].vars_list[0]);
    }
    // Is there a filter for the severity parameter
    if (Validation_Function_List[struct_index_(arg_)].-
    vars_list[1].filter) {
        validation +=
        validate_int(NetworkElement_getSomeInfoIDL->severity,
        Validation_Function_List[struct_index_(arg_)].vars_list[1]);
    }
    // Is there a filter for the message parameter
    if (Validation_Function_List[struct_index_(arg_)].-
    vars_list[2].filter) {
        validation +=
        validate_string(NetworkElement_getSomeInfoIDL->message,
        Validation_Function_List[struct_index_(arg_)].vars_list[2]);
    }
    if (validation > 0) {
        // something failed validation
        break; //API function does not get called
    }
}
// Everything is Ok, call the API function
NetworkElement_getSomeInfoIDL(
    ...//API function from above
}
```

The above code may first check if a filter exists for each given parameter, then iteratively execute each filter associated with the given parameter. In the example shown, for an integer parameter, a validate_int function is called, while validate_string is called for a string parameter. For each of these validate functions, the first parameter is the value of the parameter, while the second is the parameter filter. In the example shown, a validation variable may record if there are any filter violations. After executing the one or more filters associated with each one or more parameters, if the validation variable has been incremented, a filter must have been violated, so the function breaks and the API function would not be called.

An example validate_int function is:

```
// data is the integer value to check
// validation_data is the filter parameters
validate_int(unsigned int data,
struct validate_int_data validation_data) {
if (validation_data.checkmin) {
    if(data < validation_data.checkmin) { return 1; }
}
if (validation_data.checkmax) {
    if(data > validation_data.checkmax) { return 1; }
}
if (validation_data.checkfilter) { // blacklist. may also loop here if
there are multiple values
    if(data == validation_data. checkfilter) { return 1; }
}
return 0;
}
```

In this example, "return 1" indicates that there has been a filter violation, so this function may report back to getSomeInfoIDL( ) that there has been a validation error, which prevents the API function from being called. Conversely, "return 0" indicates that there has been no filter violation for this parameter. The blacklist conditional example above checks for exact matches of numbers that are not permitted. This conditional may also loop iteratively for each blacklisted value. Additional filters iteratively enforcing regular expression white lists and black lists are also possible, as discussed previously. Filters such as regular expressions that are more computationally expensive may be performed last in order to maximize efficiency and minimize computational cost.

Filters may also be benchmarked, perhaps by measuring the central processing unit (CPU) impact, thus providing the client user/customer with more information when deciding whether to implement the filter or not. Client users may select a setting to load newly available filters into each network element as they become available. The client may also check for updates periodically from the vendor, and selectively incorporate available filters as desired. The vendor may also proactively inform the client user of available and recommended filters that are not currently in use for a given network element. Further, all filter updates may be immediately applied to the network element.

Filters may even be defined by the client user, allowing them to restrict or allow possible SDN usage as needed. For example, a certain API call may run a string on the command line. The client user may not wish for all possible strings to be available on the command line. So, the client user may define a white list filter to only allow one or a number of predetermined inputs to be executed. As an example, "Sudo" is a Linux command line allowing for commands to be executed at root privilege. An SDN API on a Linux-based network element may have an API call allowing for a command line string to be executed. The network operator may have a limited user profile to allow simple command line calls but may want to limit the "sudo" call. A filter could be added for the command line execution, API call to filter the execution string looking for the command "sudo." Another network operator may want to prevent a subset of API calls from being accessed. The operator can create filters for each API call, either to filter out the API call itself or to set up filters such that no matter the value of one of the fields, it cannot validate. For example, if there is an unsigned integer (being 0 or greater) based session identifier, a filter disallowing values of 0 or higher would prevent the API call from succeeding. These restrictions may also help a client user achieve enhanced performance of network elements, as API functions with a high performance cost may be restricted. Thus, such filters can be added dynamically for networking elements to lock down unwanted SDN API access.

Another technique is provided that monitors and records/logs all API calls received at a given network element. It is possible that individual API calls may validate and not pose a security risk, but that a certain combination or order of individually valid API calls may together pose a threat. For example, three API calls received in a particular order may cause a network element to shut down or the software to crash. Thus, filters may require monitoring not only incoming API calls, but the history of API calls received to identify sequences that pose potential threats. If the last API call is received in a known threatening sequence, the last API call may be dropped, i.e. the associated API function is not executed. One or more API calls in the threatening sequence may similarly be dropped.

It may also be the case that a given series of API calls is not necessarily a threat, but may be a threat if the parameters of the series of API calls have given values or a known range of values. While these API calls with the given parameters may not normally be of concern, if called within a particular sequence, a crash can occur. Thus, a filter may define API call sequences and associated parameter values that may pose a security risk. For example, a filter may require that if a particular sequence of three API calls are received, wherein the second call has a particular parameter value, and the third call has a particular range of parameter values, one or more of the calls in the three API calls may be dropped.

Figure 4:
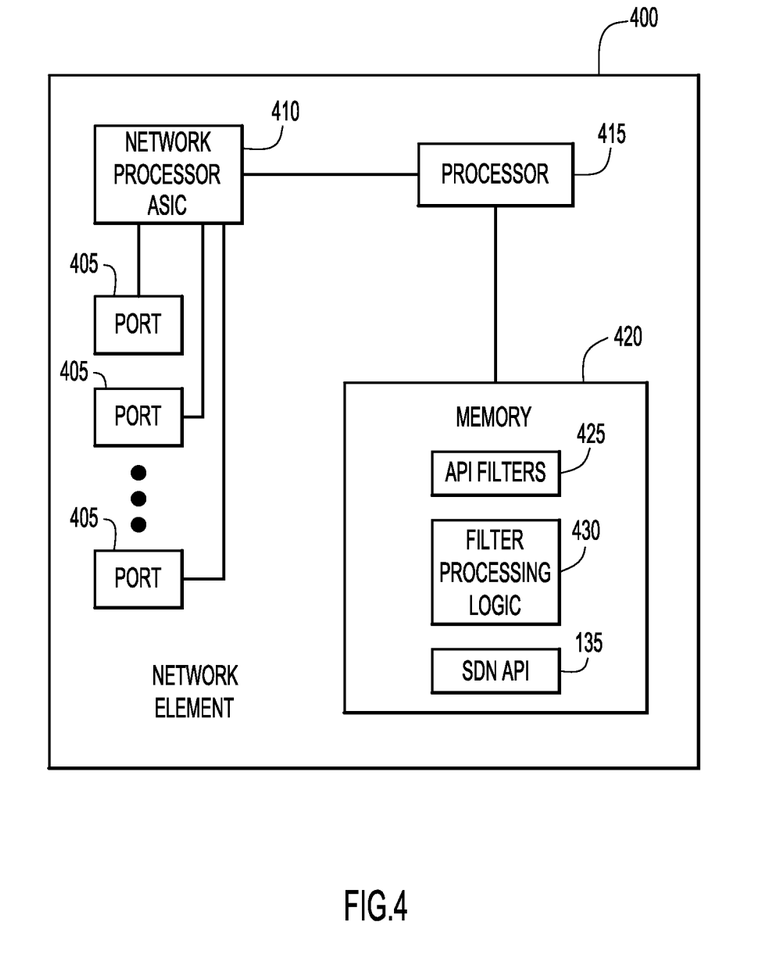
FIG. 4 shows an example block diagram of a network element configured to validate parameters of an API call according to techniques presented herein.

FIG. 4 shows an example block diagram of a physical network element such as elements 115(*a*)-115(*c*), 130 and 115(*f*) that are configured to perform the techniques presented herein. The network element 400 comprises, among other components, a plurality of network ports 405, a network processor application specific integrated circuit (ASIC) unit 410, a processor 415 and a memory 420. The ports 405 are configured to receive network communications (e.g., packets) and to send network communications. The ports are coupled to the network processor ASIC 410. The network processor ASIC 410 enables packets received by the network element 400 to be forwarded in the network. For example, when the network element 400 receives a packet at a first port, the network processor ASIC 410 determines a second port on which the packet should be forwarded in the network. That is, if a packet is received at the first port from server 1, the network processor ASIC 410 may determine to forward the packet to the second port, which may service a server 2.

The network processor ASIC 410 is coupled to the processor 415. The processor 415 is, for example, a microprocessor or microcontroller that is configured to execute program logic instructions (i.e., software) for carrying out various operations and tasks of the network element device 400, as described herein. The functions of the processor 415 may be implemented by logic encoded in one or more tangible computer readable storage media or devices (e.g., storage devices, compact discs, digital video discs, flash memory drives, etc. and embedded logic such as an ASIC, digital signal processor instructions, software that is executed by a processor, etc.).

The memory 420 may comprise read only memory (ROM), random access memory (RAM), magnetic disk storage media devices, optical storage media devices, flash memory devices, electrical, optical, or other physical/tangible (non-transitory) memory storage devices. The memory 420 stores software instructions and data/information for API filters 425, filter processing logic 430, and SDN API 135, all of which contain instructions for carrying out the techniques presented herein when executed by processor 415. The SDN API 135 may interact with ports 405 to send and receive data, and may receive API calls that may cause associated API functions in the network element to be executed. Thus, in general, memory 420 may comprise one or more computer readable storage media (e.g., a memory storage device) encoded with software comprising computer executable instructions and when the software is executed (e.g., by the processor 415), it is operable to perform the techniques described herein for API filters 425 and filter processing logic 430. Further, the memory 420 may store instructions for virtual machines for virtual switch 115(d) and virtual router 115(e). Each virtual network element such as virtual switch 115(d) and virtual router 115(e) may in turn have its own API filters 425 and filter processing logic 430 within their memory stores.

The API filters 425, filter processing logic 430, and SDN API 135 may take any of a variety of forms, so as to be encoded in one or more tangible computer readable memory media or storage devices for execution, such as fixed logic or programmable logic (e.g., software/computer instructions executed by a processor). The processor 415 may be an ASIC that comprises fixed digital logic, or a combination thereof.

Thus, a solution is provided which supports a SDN architecture and allows API function fixes to be deployed in hours as opposed to months. This minimizes costs to the vendor by avoiding accelerated firmware fixes and allows network operators to secure their environments quickly. Input validation may occur in-line with the processing, and does not require a separate monitor like an anti-virus (AV) engine. Filters may be loaded dynamically while the network element continuously functions and provides services, and without requiring a reboot of the network element, as conventional security updates require. Additionally, this solution does not require the addition or insertion of new executable functions. This is to say that loading running code is not required, changing the source code of the network element is not required, and loading a new network element firmware image or executable is further not required. Further, network operators/users/customers may choose which filters to apply, and may apply them on a per-network element basis, or per-network element type basis. Each filter may be narrowly tailored to address a specific weakness and security vulnerability. Further, filters may be first applied with a lowest computing cost, followed by the filters with a higher computing cost. This solution is therefore much more efficient from a memory, CPU utilization and processing time perspective.

In summary, a method is provided, comprising: 1 dynamically loading one or more filters that validate data across an application programming interface (API) boundary in a network element such that a reboot of the network element is not required to use the one or more filters; receiving an API call for an API function, wherein the API call contains one or more parameter values associated with the API function; validating the parameters using the one or more filters; if it is determined that the one or more filters validate the parameters for the API function, executing the API function using the parameter values; and if it is determined that the one or more filters do not validate the parameters for the API function, aborting execution of the API function.

An apparatus is also provided comprising: a plurality of network ports; a network processor unit coupled to the plurality of network ports; a processor coupled to the network processor unit. The processor is configured to: dynamically load one or more filters that validate data across an application programming interface (API) boundary such that a reboot of a network element is not required to use the one or more filters; receive an API call for an API function, wherein the API call contains one or more parameter values associated with the API function; validate the parameters using one or more filters that validate data traversing an API boundary of a network element; if it is determined that the one or more filters validate the parameters for the API function or there are no associated filters, execute the API function using the parameter values; and if it is determined that the one or more filters do not validate the parameters for the API function, abort execution of the API function.

A computer-readable storage media is provided that is encoded with software comprising computer executable instructions and when the software is executed, it is operable to: dynamically load one or more filters that validate data across an application programming interface (API) boundary such that a reboot of a network element is not required to use the one or more filters; receive an API call for an API function, wherein the API call contains one or more parameter values associated with the API function; validate the parameters using one or more filters that validate data traversing an API boundary of a network element; if it is determined that the one or more filters validate the parameters for the API function or there are no associated filters, execute the API function using the parameter values; and if it is determined that the one or more filters do not validate the parameters for the API function, abort execution of the API function.

Although the techniques described herein as embodied in one or more specific examples, it is nevertheless not intended to be limited to the details shown, since various modifications and structural changes may be made therein within the scope and range of equivalents of the claims. Accordingly, it is appropriate that the appended claims be construed broadly as set forth in the following claims.

What is claimed is:

1. A method comprising:
   dynamically loading one or more filters that validate data across an application programming interface (API) boundary in a network element of a software defined network, such that a reboot of the network element is not required to use the one or more filters;
   receiving an API call for an API function associated with the software defined network, wherein the API call contains one or more parameter values associated with the API function;
   validating the parameters using the one or more filters;
   if it is determined that the one or more filters validate the parameters for the API function, executing the API function using the parameter values; and
   if it is determined that the one or more filters do not validate the parameters for the API function, aborting execution of the API function.

2. The method of claim 1, further comprising presenting to a user performance cost data associated with loading the one or more filters;
   receiving confirmation from the user as to whether to load the one or more filters; and
   loading the one or more filters only depending on whether confirmation from the user is received.

3. The method of claim 1, further comprising:
in response to receiving the API call, applying one or more filters to identify malformed data in the API call; and
in response to determining that there is no malformed data in the API call, parsing the API call to determine the parameter values.

4. The method of claim 3, further comprising:
parsing the API call to determine authorization values; and
applying one or more filters to identify malicious authorization values.

5. The method of claim 1, wherein the loading of the one or more filters is initiated by a software defined networking controller to download the one or more filters to the network element.

6. The method of claim 1, wherein the one or more filters comprise at least one of: a regular expression black list filter and regular expression white list filter.

7. The method of claim 1, further comprising:
monitoring a plurality of API calls; and
in response to identifying a sequence of API calls in the plurality of API calls defined in the one or more filters that poses a security risk, dropping one or more API calls from the sequence of API calls.

8. The method of claim 1, wherein validating the API call further comprises:
if it is determined that there are one or more filters associated with the API function, determining whether there are one or more filters associated with the one or more parameters; and
if it is determined that there are one or more filters associated with the one or more parameters, validating the API parameters using the associated one or more filters.

9. The method of claim 1, further comprising:
receiving a firmware update for the network element to fix a security vulnerability associated with one or more filters that have already been loaded into the network element; and
in response to receiving the firmware update, removing the filters associated with the security vulnerability.

10. An apparatus comprising:
a plurality of network ports;
a network processor unit coupled to the plurality of network ports;
a processor coupled to the network processor unit, and configured to:
dynamically load one or more filters that validate data across an application programming interface (API) boundary in a software defined network, such that a reboot of a network element is not required to use the one or more filters;
receive an API call for an API function associated with the software defined network, wherein the API call contains one or more parameter values associated with the API function;
validate the parameters using one or more filters that validate data traversing an API boundary of a network element;
if it is determined that the one or more filters validate the parameters for the API function or there are no associated filters, execute the API function using the parameter values; and
if it is determined that the one or more filters do not validate the parameters for the API function, abort execution of the API function.

11. The apparatus of claim 10, wherein the processor is further configured to:
present to a user performance cost data associated with loading the one or more filters;
receive confirmation from the user as to whether to load the one or more filters; and
load the one or more filters only depending on whether confirmation from the user is received.

12. The apparatus of claim 10, wherein the processor is further configured to:
in response to receiving the API call, apply one or more filters to identify malformed data in the API call; and
in response to determining that there is no malformed data in the API call, parse the API call to determine the parameter values.

13. The apparatus of claim 10, wherein the processor is further configured to:
monitor a plurality of API calls; and
in response to identifying a sequence of API calls in the plurality of API calls defined in the one or more filters that poses a security risk, drop one or more API calls from the sequence of API calls.

14. The apparatus of claim 10, wherein the processor is further configured to:
if it is determined that there are one or more filters associated with the API function, determine whether there are one or more filters associated with the one or more parameters; and
if it is determined that there are one or more filters associated with the one or more parameters, validate the parameters using the one or more associated filters.

15. The apparatus of claim 10, wherein the processor is configured to:
receive a firmware update for the network element to fix a security vulnerability associated with a filter that has already been loaded into the network element; and
in response to receiving the firmware update, remove the filters associated with the fixed security vulnerabilities.

16. A non-transitory computer-readable storage media encoded with software comprising computer executable instructions and when the software is executed operable to:
dynamically load one or more filters that validate data across an application programming interface (API) boundary in a software defined network, such that a reboot of a network element is not required to use the one or more filters;
receive an API call for an API function associated with the software defined network, wherein the API call contains one or more parameter values associated with the API function;
validate the parameters using one or more filters that validate data traversing an API boundary of a network element;
if it is determined that the one or more filters validate the parameters for the API function or there are no associated filters, execute the API function using the parameter values; and
if it is determined that the one or more filters do not validate the parameters for the API function, abort execution of the API function.

17. The non-transitory computer-readable storage media of claim 16, further comprising instructions operable to:
present to a user performance cost data associated with loading the one or more filters;
receive confirmation from the user as to whether to load the one or more filters; and
load the one or more filters only depending on whether confirmation from the user is received.

18. The non-transitory computer-readable storage media of claim 16, further comprising instructions operable to:
   in response to receiving the API call, apply one or more filters to identify malformed data in the API call; and
   in response to determining that there is no malformed data in the API call, parse the API call to determine the parameter values.

19. The non-transitory computer-readable storage media of claim 16, further comprising instructions operable to:
   if it is determined that there are one or more filters associated with the API function, determine whether there are one or more filters associated with the one or more parameters; and
   if it is determined that there are one or more filters associated with the one or more parameters, validate the API call parameters using the one or more filters.

20. The non-transitory computer-readable storage media of claim 16, further comprising instructions operable to:
   monitor a plurality of API calls; and
   in response to identifying a sequence of API calls in the plurality of API calls defined in the one or more filters that poses a security risk, drop one or more API calls from the sequence of API calls.

* * * * *